United States Patent
Wang

[11] Patent Number: 5,666,874
[45] Date of Patent: Sep. 16, 1997

[54] SAUCEPAN PERMITTING PLACING OF A STIRRING SPOON IN A STABLE MANNER THEREON

[76] Inventor: Chung-Che Wang, No. 235-100, Sec. 4, Chang-Ho St., Tainan City, Taiwan

[21] Appl. No.: 763,370

[22] Filed: Dec. 13, 1996

[51] Int. Cl.⁶ .............. A47J 27/00; A47J 27/08; A47J 36/00; B01F 7/00
[52] U.S. Cl. .............. 99/348; 16/110 A; 16/114 A; 99/403; 366/130; 366/197; 366/279
[58] Field of Search ............... 99/348, 337, 403, 99/646 R; 16/114 R, 114 A, 110 A, 110 R, DIG. 24; 220/752, 759, 912; 294/27.1, 33; 366/129, 130, 197, 279

[56] References Cited

U.S. PATENT DOCUMENTS

| | | | |
|---|---|---|---|
| 2,494,159 | 1/1950 | Bernstein | 16/114 A |
| 3,810,605 | 5/1974 | Lambert | 99/348 |
| 4,429,624 | 2/1984 | Linn | 99/348 |
| 4,820,054 | 4/1989 | Wong | 366/287 |
| 4,832,501 | 5/1989 | McCauley | 366/279 |
| 4,854,717 | 8/1989 | Crane et al. | 366/197 |
| 4,856,910 | 8/1989 | Cuschera | 99/348 X |
| 4,904,834 | 2/1990 | Bowen | 366/231 X |
| 4,924,444 | 5/1990 | Castellanos | 366/129 |
| 4,967,939 | 11/1990 | Taylor | 366/136 |
| 5,112,135 | 5/1992 | Rupp | 366/197 |
| 5,373,608 | 12/1994 | Welch | 16/110 A |
| 5,533,805 | 7/1996 | Mandel | 366/197 |

Primary Examiner—Timothy F. Simone
Attorney, Agent, or Firm—Harness, Dickey & Pierce, P.L.C.

[57] ABSTRACT

A saucepan includes a pan with an annular top edge, and an elongated grip connected securely to the pan. The grip has an end portion with an opening formed therethrough for hanging of the saucepan on a hook when not in use. The grip further has a peak portion between the pan and the opening. The peak portion of the grip and the top edge of the pan are generally located in the same horizontal plane so as to support the spoon on the peak portion of the grip and the top edge of the pan in such a manner that the handle of the spoon is inserted into the opening of the grip and that the handle of the spoon is generally located in a horizontal position when the saucepan is in a cooking condition.

3 Claims, 4 Drawing Sheets

SAUCEPAN PERMITTING PLACING OF A STIRRING SPOON IN A STABLE MANNER THEREON

BACKGROUND OF THE INVENTION

1. Field of the Invention

The invention relates to a saucepan, more particularly to a saucepan which permits placing of a stirring spoon in a stable manner thereon during cooking.

2. Description of the Related Art

Referring to FIG. 1, a conventional saucepan 1 is shown to include a pan 10 with an annular top edge 11, a connecting plate 12 fixed on an external surface of the pan 10, and an elongated grip 2 which has a narrower front end portion 20 provided with a through hole 200 so as to permit extension of a screw 21 therethrough for fastening the grip 2 to the threaded hole 120 in the connecting plate 12 and a rear end portion 23 with an opening 24 formed therethrough for hanging the saucepan 1 on a hook when not in use. A decorated rectangular sleeve 22 is sleeved on the front end portion 20 of the grip 2 so as to cover the connecting plate 12.

Referring to FIG. 2, after food in the pan 10 has been stirred with the use of a concave stirring portion 31 of a spoon 3, in the event the spoon 3 is placed on any other receptacles adjacent to the pan 10, the receptacle may get dirty, thereby resulting in necessity of cleaning the receptacle. In order to avoid this drawback, the straight handle 30 of the spoon 3 is usually inserted into the opening 24 in the grip 2, wherein the spoon 3 is generally inclined relative to the grip 2 such that the gravy which lingers on the concave stirring portion 31 may flow along the straight handle 30, thereby smearing the grip 2 with the gravy. Furthermore, because the opening 24 of the grip 2 has a width that is greater than the diameter of the straight handle 30, the spoon 3 may wobble in the opening 24 and accidentally fall therefrom.

SUMMARY OF THE INVENTION

The object of this invention is to provide a saucepan which permits placing of a stirring spoon in a stable manner thereon after stirring the food being cooked in the saucepan.

Accordingly, the saucepan of this invention permits placing of a stirring spoon in a stable manner thereon and includes a pan with an annular top edge, and an elongated grip connected securely to the pan. The grip has an end portion with an opening formed therethrough for hanging the saucepan on a hook when the saucepan is not in use. The grip further has a peak portion between the pan and the opening. The peak portion of the grip and the top edge of the pan are generally located in the same horizontal plane so as to support the spoon on the peak portion of the grip and the top edge of the pan, in such a manner that the handle of the spoon can be inserted into the opening in the grip and that the handle of the spoon is generally located in a horizontal position when the saucepan is in use.

BRIEF DESCRIPTION OF THE DRAWINGS

Other features and advantages of this invention will become apparent in the following detailed description of the preferred embodiment with reference to the accompanying drawings, in which.

DETAILED DESCRIPTION OF THE PREFERRED EMBODIMENT

Figure 1:
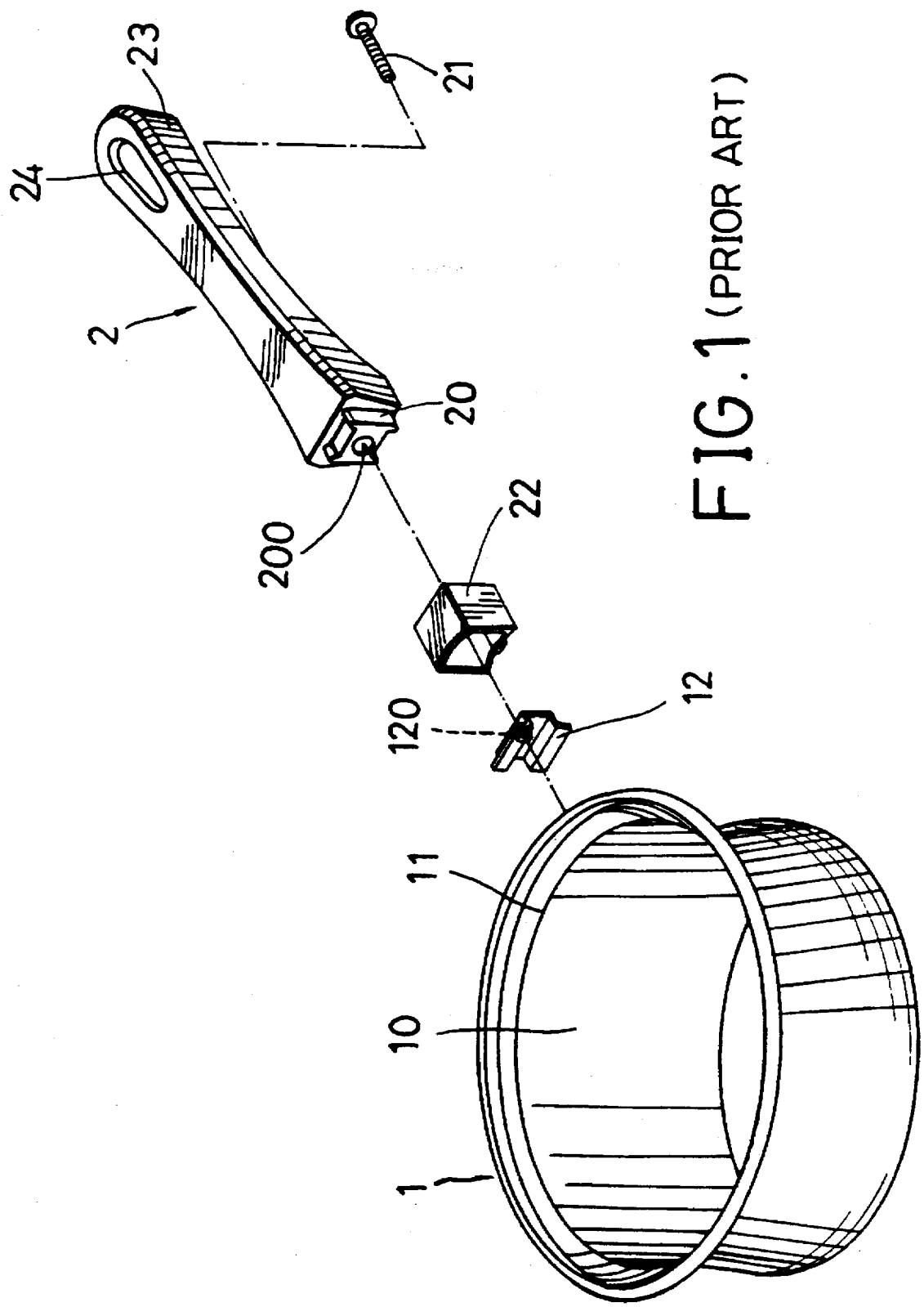
FIG. 1 is an exploded view of a conventional saucepan.
Figure 2:
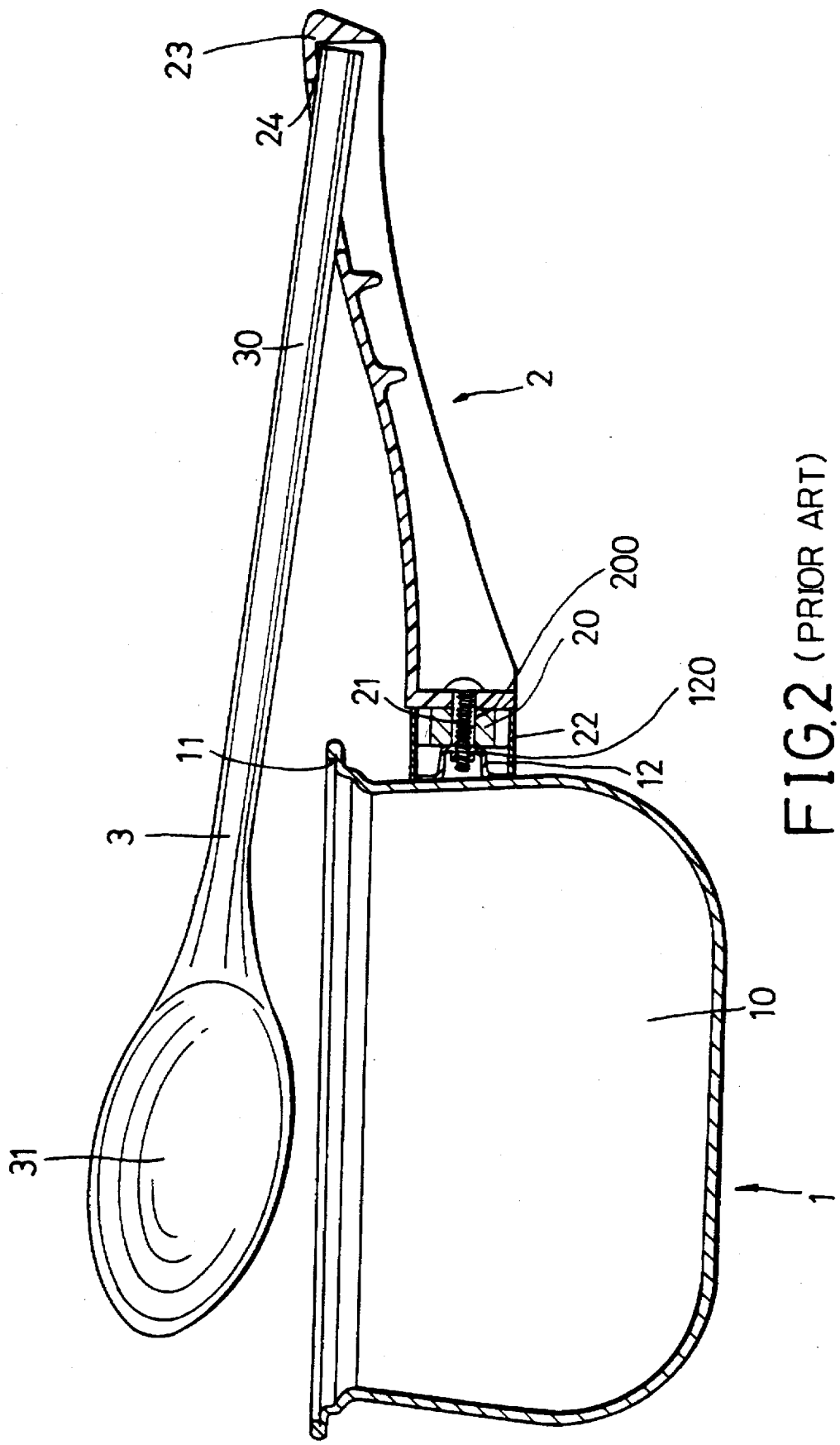
FIG. 2 illustrates how a stirring spoon is placed on the conventional saucepan after the food being cooked in the conventional saucepan has been stirred with the use of the spoon.
Figure 3:
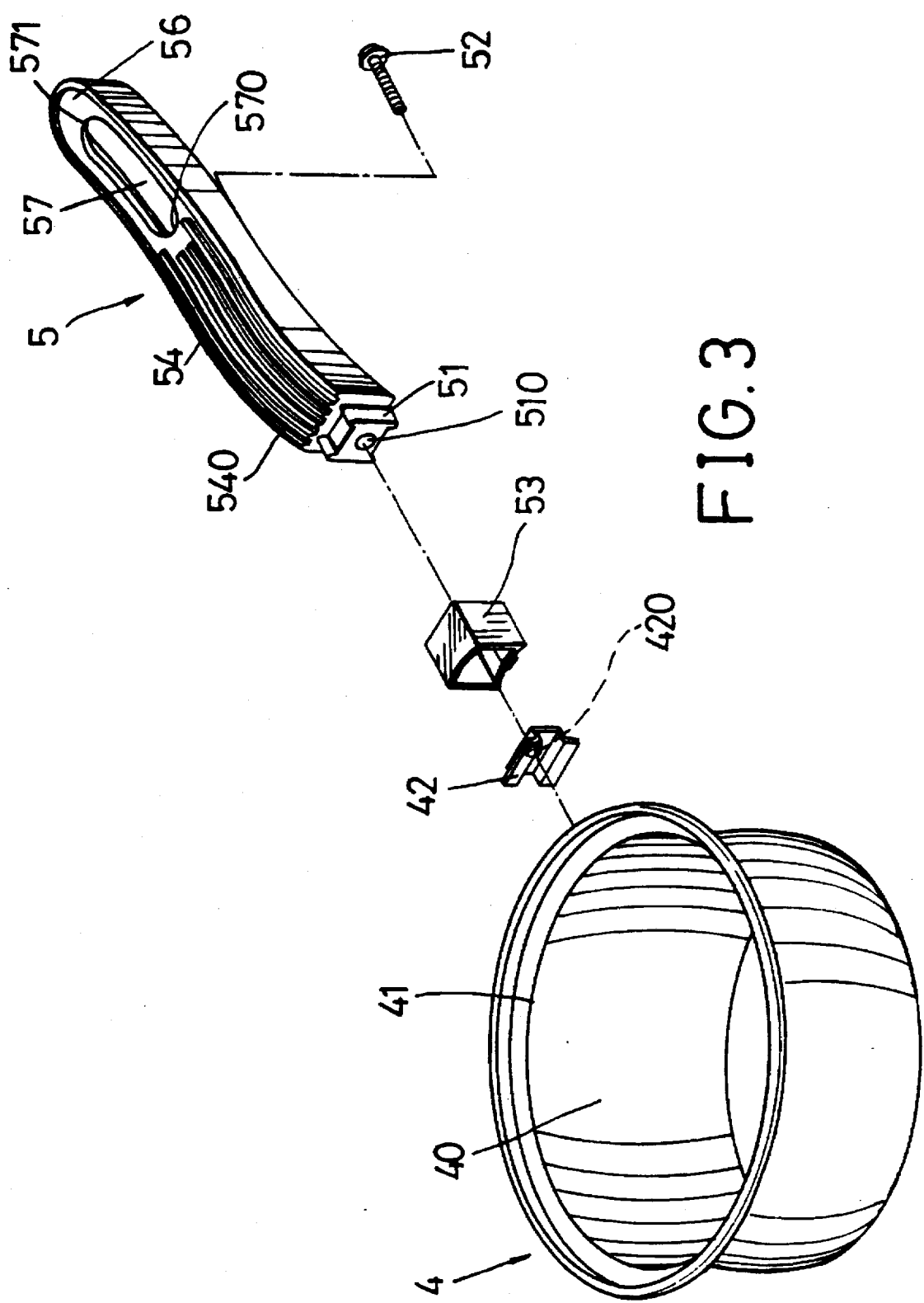
FIG. 3 is an exploded view of a saucepan according to this invention.
Figure 4:
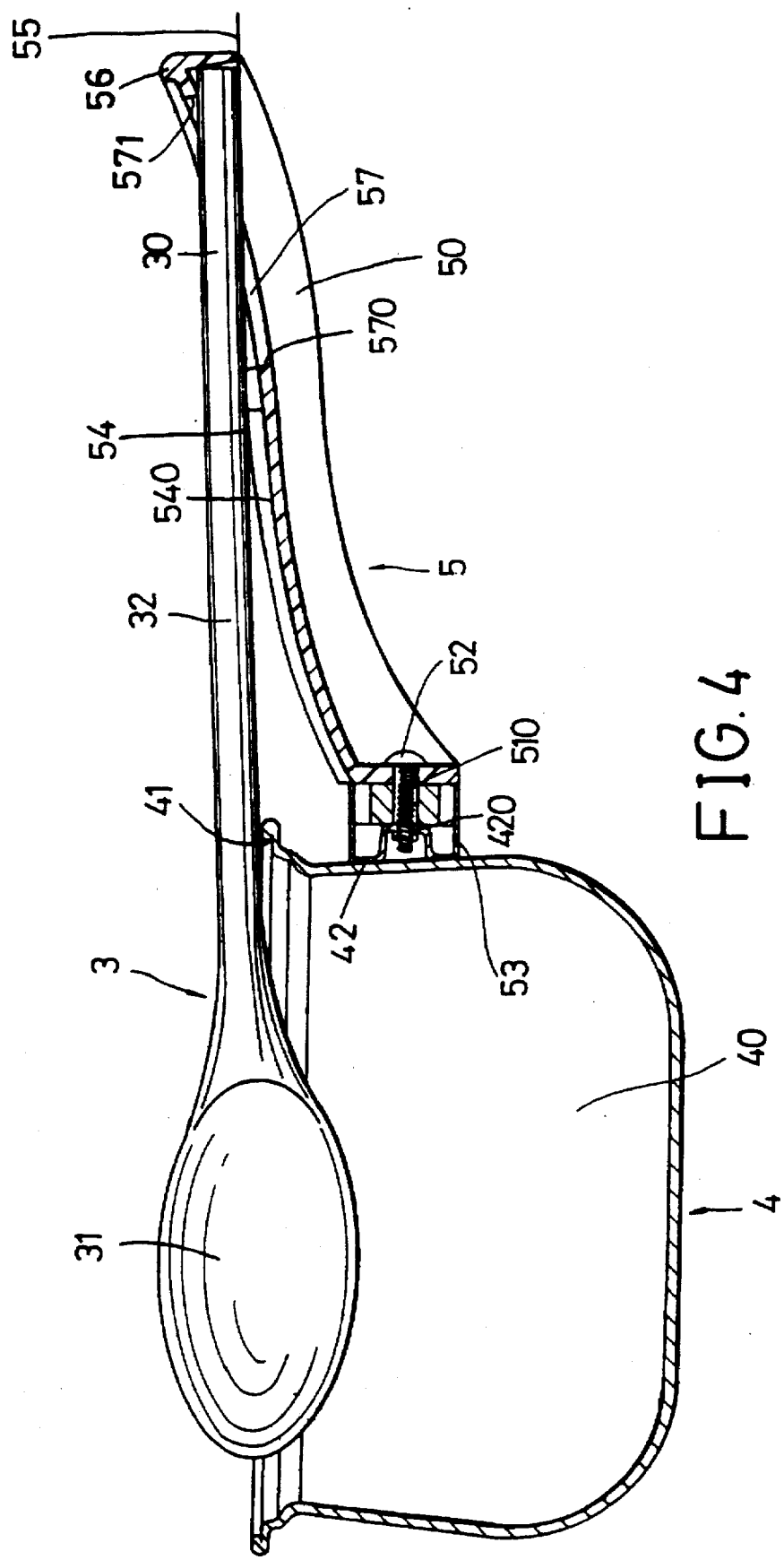
FIG. 4 illustrates how a stirring spoon is placed on the saucepan of this invention after the food being cooked in the saucepan has been stirred with the use of the spoon.

Referring to FIGS. 3 and 4, a saucepan 4 according to this invention includes a pan 40 with an annular top edge 41, a connecting plate 42 fixed on an external surface of the pan 40, and an elongated and generally inverted U-shaped cross-section grip 5 which has a narrower front end portion 51 provided with a through hole 510 so as to permit extension of a screw 52 therethrough for fastening the grip 5 to the threaded hole 420 in the connecting plate 42, thereby fixing the grip 5 securely to the pan 40. A decorated rectangular sleeve 53 is sleeved on the front end portion 51 of the grip 5 so as to cover the connecting plate 42.

The grip 5 further has a distal end portion 56 with an elongated opening 57 formed therethrough for hanging the saucepan 4 on a hook when not in use, a peak portion 570 between the pan 40 and the opening 57, and a ribbed upper surface 54 formed with a plurality of lengthwise ribs 540 which extend over the peak portion 570. In this embodiment, the peak portion 570 of the grip 5 and the top edge 41 of the pan 40 are generally located in the same horizontal plane 55 for supporting the spoon 3 on the peak portion 570 of the grip 5 and the top edge 41 of the pan 40 while the end 571 of the opening 57 is located above the horizontal plane 55.

The stirring spoon 3 includes an elongated straight handle 30 and a concave stirring portion 31 integrally formed with the handle 30. As best illustrated in FIG. 4, after the food in the pan 40 has been stirred with the use of the stirring portion 31, the handle 30 of the spoon 3 can be inserted into the opening 57 in the grip 5 such that the handle 30 of the spoon 3 is generally located in a horizontal position because the peak portion 570 of the grip 5 and the top edge 41 of the pan 40 are located in the same horizontal plane 55 so as to support the handle 30 of the spoon 3 on the peak portion 570 of the grip 5 and the top edge 41 of the pan 40.

Because the straight handle 30 of the spoon 3 is prevented by the longitudinal sides of the elongated opening 57 from moving to the lateral sides and the lengthwise ribs 540 which extend over the peak portion 570 prevent the spoon 3 from transversely sliding on the peak portion 570, the handle 30 of the grip 3 can be placed stably on the saucepan 4 of this invention.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A saucepan which permits placing of a stirring spoon in a stable manner thereon, the stirring spoon including an elongated straight handle and a concave stirring portion integrally formed with the handle, the saucepan including a pan with an annular top edge, and an elongated grip connected securely to the pan, the grip having an end portion with an opening formed therethrough for hanging of the saucepan on a hook when not in use, wherein the grip further has a peak portion between the pan and the opening, the peak portion of the grip and the top edge of the pan being generally located in the same horizontal plane so as to support the spoon on the peak portion of the grip and the top edge of the pan, in such a manner that the handle of the spoon can be inserted into the opening in the grip and that the handle of the spoon can be generally located in a horizontal position when the saucepan is in use.

2. The saucepan as claimed in claim 1, wherein the grip has a ribbed upper surface formed with a plurality of lengthwise ribs which extend over the peak portion so as to prevent the spoon from transversely sliding on the peak portion.

3. The saucepan as claimed in claim 1, wherein the grip has a generally inverted U-shaped cross-section.

* * * * *